(12) United States Patent
Mochizuki (10) Patent No.: US 7,808,586 B2
(45) Date of Patent: Oct. 5, 2010

(54) ELECTROOPTIC DEVICE AND ELECTRONIC DEVICE INCLUDING THE SAME

(75) Inventor: Hiroaki Mochizuki, Chino (JP)

(73) Assignee: Seiko Epson Corporation, Tokyo (JP)

(*) Notice: Subject to any disclaimer, the term of this patent is extended or adjusted under 35 U.S.C. 154(b) by 580 days.

(21) Appl. No.: 11/810,087

(22) Filed: Jun. 4, 2007

(65) Prior Publication Data

US 2007/0281223 A1    Dec. 6, 2007

(30) Foreign Application Priority Data

Jun. 6, 2006   (JP) ............... 2006-157016

(51) Int. Cl.
   *G02F 1/1333*   (2006.01)
(52) U.S. Cl. .................. 349/110; 349/111; 349/158
(58) Field of Classification Search ................ 349/158, 349/110, 153, 111, 138, 149, 151, 152; 430/5
   See application file for complete search history.

(56) References Cited

U.S. PATENT DOCUMENTS

| | | | |
|---|---|---|---|
| 6,069,677 A | 5/2000 | Kitai | |
| 6,373,616 B1 * | 4/2002 | Ogawa et al. | 359/245 |
| 6,414,781 B1 | 7/2002 | Saitoh | |
| 6,498,672 B2 | 12/2002 | Saitoh | |
| 6,654,083 B1 * | 11/2003 | Toda et al. | 349/110 |
| 6,809,786 B2 * | 10/2004 | Lee | 349/115 |
| 7,502,008 B2 * | 3/2009 | Jeoung et al. | 345/98 |

FOREIGN PATENT DOCUMENTS

| | | |
|---|---|---|
| JP | 06-175157 | 6/1994 |
| JP | 10-232629 | 9/1998 |
| JP | 11-295683 A | 10/1999 |
| JP | 2000-338474 | 12/2000 |
| JP | 2004-029711 | 1/2004 |
| JP | 2005-043699 | 2/2005 |

* cited by examiner

*Primary Examiner*—Thoi V Duong
(74) *Attorney, Agent, or Firm*—AdvantEdge Law Group, LLC (57) ABSTRACT

An electrooptic device includes: a pair of first and second substrates that sandwich an electrooptic material; a plurality of pixel electrodes disposed in a pixel region on the first substrate; a first light shielding layer disposed on the second substrate, the first light shielding layer defining the periphery of the pixel region; a sealing material that bonds the first substrate and the second substrate together in a sealing region around the periphery of a first light shielding region having the first light shielding layer; a dustproof substrate disposed on the surface of the second substrate opposite to the electrooptic material; a second light shielding layer disposed on the dustproof substrate so as to enclose the pixel region; and a third light shielding layer disposed on the dustproof substrate so as to at least partly overlap with the first and second light shielding layers.

9 Claims, 8 Drawing Sheets

ELECTROOPTIC DEVICE AND ELECTRONIC DEVICE INCLUDING THE SAME

BACKGROUND

1. Technical Field

The present invention relates to a technical field of an electrooptic device such as a liquid crystal device and an electric device including the electrooptic device, such as a liquid crystal projector.

2. Related Art

A Liquid crystal device which is an example of this type of electrooptic device is generally constructed such that a device substrate on which pixel electrodes and switching elements are disposed and an opposing substrate on which an opposing electrode is provided are bonded together at a sealing region with a sealing material such as ultraviolet cure resin, with a specified clearance in between, and liquid crystal is sealed between the substrates. In the case where the liquid crystal device is used for a light valve of a liquid crystal projector, when dust particles (hereinafter, simply referred to as dust) adhere to the surface of the light valve, the image of the dust is also projected to a screen to raise the possibility of projecting the dust image on the screen, thus decreasing the quality of the image. Therefore, a dustproof substrate is often disposed on the outer surface of the substrate of a liquid crystal device (for example, refer to JP-A-11-295683).

The opposing substrate generally has a frame light shielding layer (also referred to as a periphery parting layer) that defines the frame (or the outline) of the display region of the liquid crystal device. Not to interfere with ultraviolet radiation from the outside of the opposing substrate to harden the sealing member, the frame light shielding layer is often provided with a clearance corresponding to a design margin so as not to overlap with the sealing region. This may cause leakage of light from the clearance between the frame light shielding layer and the sealing region to decrease the display quality. Accordingly, a technique for increasing the light shielding effect of the vicinity of the frame of the display region without interfering with the ultraviolet radiation for hardening the sealing material is disclosed in JP-A-11-295683 by the applicant of the invention.

However, when the frame light shielding layer on the opposing substrate and the light shielding layer on the dustproof substrate become out of agreement, the light shielding layer on the dustproof substrate may not provide sufficient light shielding effect in the vicinity of the frame.

SUMMARY

An advantage of some aspects of the invention is to provide an electrooptic device having improved light shielding effect in the vicinity of the frame of the display region and an electronic device including the same.

A first electrooptic device according to a first aspect of the invention includes: a pair of first and second substrates that sandwich an electrooptic material; a plurality of pixel electrodes disposed in a pixel region on the first substrate; a first light shielding layer disposed on the second substrate, the first light shielding layer defining the periphery of the pixel region; a sealing material that bonds the first substrate and the second substrate together in a sealing region around the periphery of a first light shielding region having the first light shielding layer; a dustproof substrate disposed on the surface of the second substrate opposite to the electrooptic material; a second light shielding layer disposed on the dustproof substrate so as to enclose the pixel region; and a third light shielding layer disposed on the dustproof substrate so as to at least partly overlap with the first and second light shielding layers.

The first electrooptic device is constructed such that the pair of first and second substrates are bonded together with a sealing material such as ultraviolet cure resin at a sealing region, with an electrooptic material such as liquid crystal in between. The first substrate has a plurality of pixel electrodes, for example, in a matrix form. The second substrate has an opposing electrode opposed to the pixel electrodes, for example, all over the substrate. When the electrooptic device is in operation, voltage is applied to the electrooptic material such as liquid crystal between the pixel electrodes and the opposing electrode according to an image signal or the like to display an image on the pixel region including the pixel electrodes or a pixel array region (or simply referred to as an image display region). The electrooptic device can let out display light emitted from a light source by transmission or reflection. For example, the electrooptic device is housed in a light-shielding case having an opening corresponding to the pixel region serving as a display region, and thus used as a light valve of a projection display device.

In this case, the periphery (that is, the frame or outline) of the pixel region is defined by the first light shielding layer made of chromium or the like on the second substrate. In other words, the first light shielding layer functions as a frame light shielding layer that defines the periphery of the pixel region serving as a display region. The first light shielding layer defines the periphery of the pixel region at a specified width while leaving a design margin inside the sealing region around the pixel region (that is, a position where the pixel region is located) so as not to interfere with ultraviolet irradiation of the sealing material made of ultraviolet cure resin or the like (while leaving a clearance between it and the sealing region so as not to overlap with the sealing region).

Furthermore, a dustproof substrate made of transparent glass or the like is disposed on the surface of the second substrate opposite to the electrooptic material (that is, the outer surface of the second substrate). This prevents direct adhesion of dust to the outer surface of the second substrate. Even if dust adheres onto the dustproof substrates, the thickness of the dustproof substrate prevents projection of the dust image onto an image. The dustproof substrate may be provided also on the surface of the first substrate opposite to the electrooptic material.

The second light shielding layer made of chromium or the like is disposed on the dustproof substrate in such a manner as to enclose the pixel region. More specifically, the second light shielding layer is disposed on the dustproof substrate so as to enclose the pixel region, typically, from the periphery of the pixel region to the rim of the dustproof substrate while leaving a design margin outside the pixel region (the region where the sealing region is located) defined by the first light shielding layer (that is, keeping a specified clearance between it and the pixel region so as not to overlap with the pixel region) and while having a portion overlapping with the first light shielding layer. This reduces exit of incident light emitted from the light source through the clearance between the first light shielding layer and the sealing material.

However, if the second light shielding layer on the dustproof substrate is formed off the design margin for overlapping with the first light shielding layer, incident light emitted from the light source can exit from the electrooptic device through the clearance between the first light shielding layer and the sealing material.

However, particularly in this case, the third light shielding layer made of aluminum or the like is formed on the first substrate in such a manner that at least part thereof overlaps with the first and second light shielding layers in plan view. More specifically, the third light shielding layer is disposed on the first substrate in such a manner as to have a portion overlapping with the first light shielding layer and also to partly overlap with the second light shielding layer while leaving a design margin outside the pixel region defined by the first light shielding layer. Typically, the third light shielding layer is provided on the region of the first substrate where the first light shielding layer and the second light shielding layer overlap in plan view, or at least partly at the boundary or clearance between the first light shielding layer and the second light shielding layer. Accordingly, even if the second light shielding layer on the dustproof substrate is formed off the design margin, exit of incident light from the electrooptic device through the clearance between the first light shielding layer and the sealing material (that is, the occurrence of light leaks) can be reduced or prevented by the third light shielding layer on the first substrate. Therefore, the light shielding effect around the pixel region of the electrooptic device can be increased.

According to the first aspect of the invention, in at least one embodiment, the third light shielding layer includes at least one line made of a light-shielding conductive film.

In this case, the third light shielding layer is made of a conductive light shielding layer made of aluminum or the like, and includes image signal lines for supplying image signals and gate lines for supplying gate signals to the switching elements such as TFTs on the first substrate. Thus the third light shielding layer can be used both as image signal lines and gate lines on the first substrate. Therefore, there is no need to have the third light shielding layer separately from the lines on the first substrate. This allows the size reduction of the electrooptic device while increasing the light shielding effect.

In the case where the third light shielding layer includes at least one line, in at least one embodiment, the third light shielding layer includes a plurality of first lines arranged at specified intervals and a plurality of second lines arranged in a layer different from the plurality of first lines with an interlayer insulator film interposed in between, the second lines each having a first portion disposed along the first lines in such a manner as to overlap with the interval.

In this case, the first portion of the second line is formed between the adjacent first lines. Typically, the first portion of the second lines has a width wider than the interval between the adjacent first lines and overlaps with the adjacent first lines. In other words, the first portion of the second lines is disposed so as to cover the interval between the adjacent first lines. This further increases the light shielding effect of the electrooptic device and reduces the size.

In the case where the third light shielding layer includes at least one line, in at least one embodiment, the third light shielding layer includes a plurality of third lines arranged at an interval of 2 μm or less.

In this case, the third lines each having a width of about 10 μm are arranged at an interval of 2 μm or less. Accordingly, narrowing the interval of the third lines while holding the insulation between the third lines (that is, while making the third light shielding layer function as a plurality of lines) increases the light shielding effect of the electrooptic device. If the interval between the third lines is larger than 2 μm, the light-shielding function of the third lines (that is, the third light shielding layer) may be decreased. However, the presence of the third light shielding layer can increase the light shielding effect correspondingly in comparison with a case without the third light shielding layer.

Another form of the first electrooptic device may be constructed such that the third light shielding layer includes a conductive film having an optical density of 2 or more.

With this structure, the third light shielding layer is a conductive film made of aluminum or the like having an optical density of 2 or more (that is, a light transmittance of 0.01 percent or less), so that it has a high light shielding effect. The presence of the third light shielding layer can surely reduce or prevent light leaks through the clearance between the first light shielding layer and the sealing material. In other words, it can surely improve the light shielding effect on the periphery of the pixel region of the electrooptic device.

A second electrooptic device according to a second aspect of the invention includes a substrate; a plurality of pixel electrodes; a plurality of first lines arranged at specified intervals in the periphery of a pixel region having the plurality of pixel electrodes, the first lines being made of a first light-shielding conductive film and each having first portions; and a plurality of second lines made of a second light-shielding conductive film arranged in a layer different from the plurality of first lines with an interlayer insulator film interposed in between, the second lines each having a second portion disposed along the first portions in such a manner as to overlap with the interval.

The second electrooptic device is constructed such that a plurality of pixel electrodes is disposed on a substrate and an opposing substrate having, for example, an opposing electrode is opposed to the pixel electrodes. When the electrooptic device is in operation, voltage is applied to the electrooptic material such as liquid crystal between the pixel electrodes and the opposing electrode according to an image signal or the like to display an image at the pixel region including the pixel electrodes substantially in the same manner as the first electrooptic device of the invention.

Particularly in this case, the electrooptic device includes a plurality of first lines each having a first portion and a plurality of second lines each having a second portion. The first and second portions are made of light-shielding conductive films arranged at different layers with an interlayer insulator film interposed in between. The plurality of first portions is arranged at specified intervals. The plurality of second portions is arranged along the first portions so as to overlap with the intervals between the first portions. Typically, the second portion has a width wider than the interval between the adjacent first portions and overlaps with the adjacent first portions. In other words, the second portion is disposed so as to cover the interval between the adjacent first portions. This reduces or prevents exit of incident light emitted from a light source from the electrooptic device in the region other than the pixel region or the display region (that is, the occurrence of light leaks). In other words, the plurality of first and second lines (properly speaking, the first and second portions) can be used as part or all of the frame light shielding layer (or outline parting layer) that defines the periphery of the pixel region. In other words, this increases the light shielding effect on the periphery of the pixel region of the electrooptic device. Moreover, this prevents the occurrence of a crack that may be generated when the frame light shielding layer that defines the periphery of the pixel region is in a single layer, thus improving the reliability of the electrooptic device.

According to a third aspect of the invention, there is provided an electronic device including the first electrooptic device according to the first aspect of the invention.

The electronic device includes the first electrooptic device according to the first aspect of the invention. This allows various electronic devices to be achieved, such as projection display devices, televisions, portable phones, electronic notebooks, word processors, viewfinder or monitor-direct-view type videotape recorders, workstations, TV phones, POS terminals, and electronic devices having a touch panel capable of high quality image display. Other examples of the electronic device include an electrophoresis device such as electronic paper, electron emission devices (a field-emission display and a conduction electron-emitter display), and display devices using the electrophoresis device or the electron emission device.

The operation and other advantages of the invention will become apparent by reference to the following embodiment(s).

BRIEF DESCRIPTION OF THE DRAWINGS

The invention will be described with reference to the accompanying drawings, wherein like numbers reference like elements.

DESCRIPTION OF EXEMPLARY EMBODIMENT

Embodiments of the invention will be described with reference to the drawings. The following embodiment(s) takes a TFT active matrix drive system liquid crystal device as an example of the electrooptic device of the invention.

A liquid crystal device according to an embodiment will be described with reference to FIGS. 1 to 7.

Figure 1:
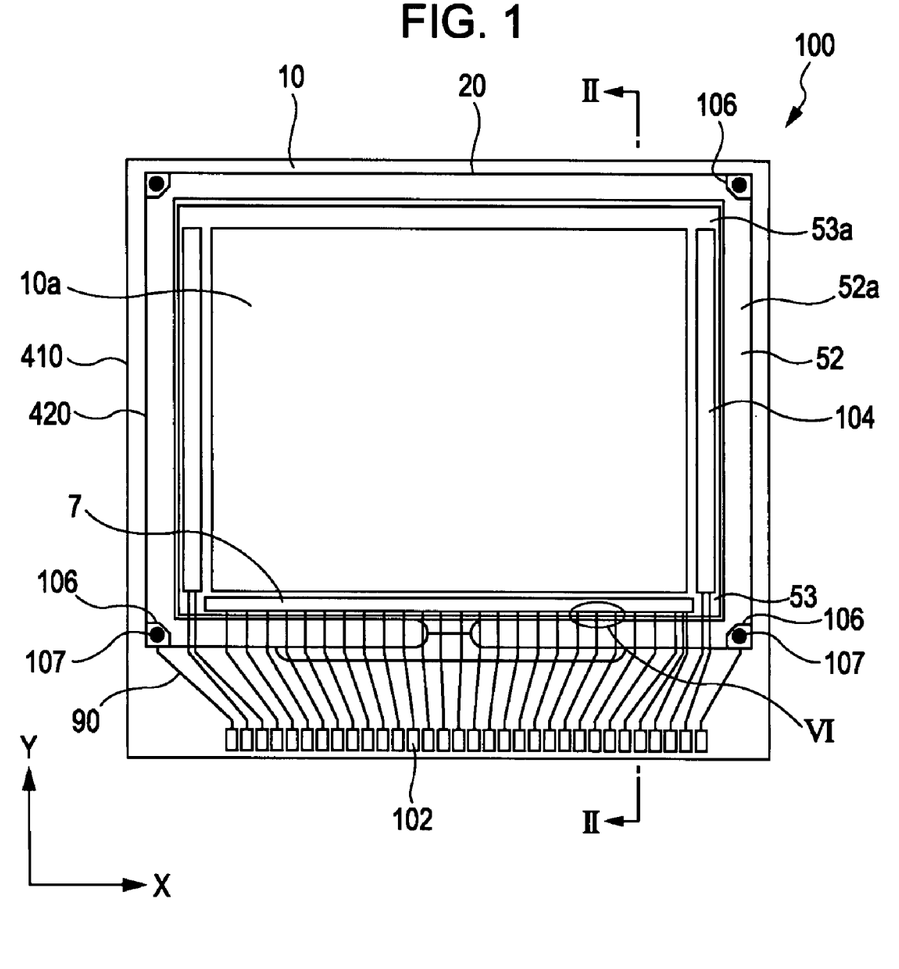
FIG. 1 is a plan view of the overall structure of a liquid crystal device according to an embodiment.
Figure 2:
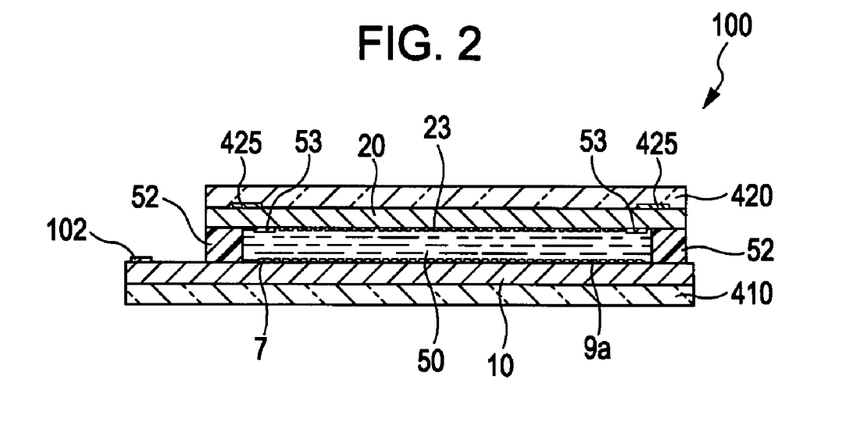
FIG. 2 is a cross-sectional view taken along line H-H of FIG. 1.
Figure 3:
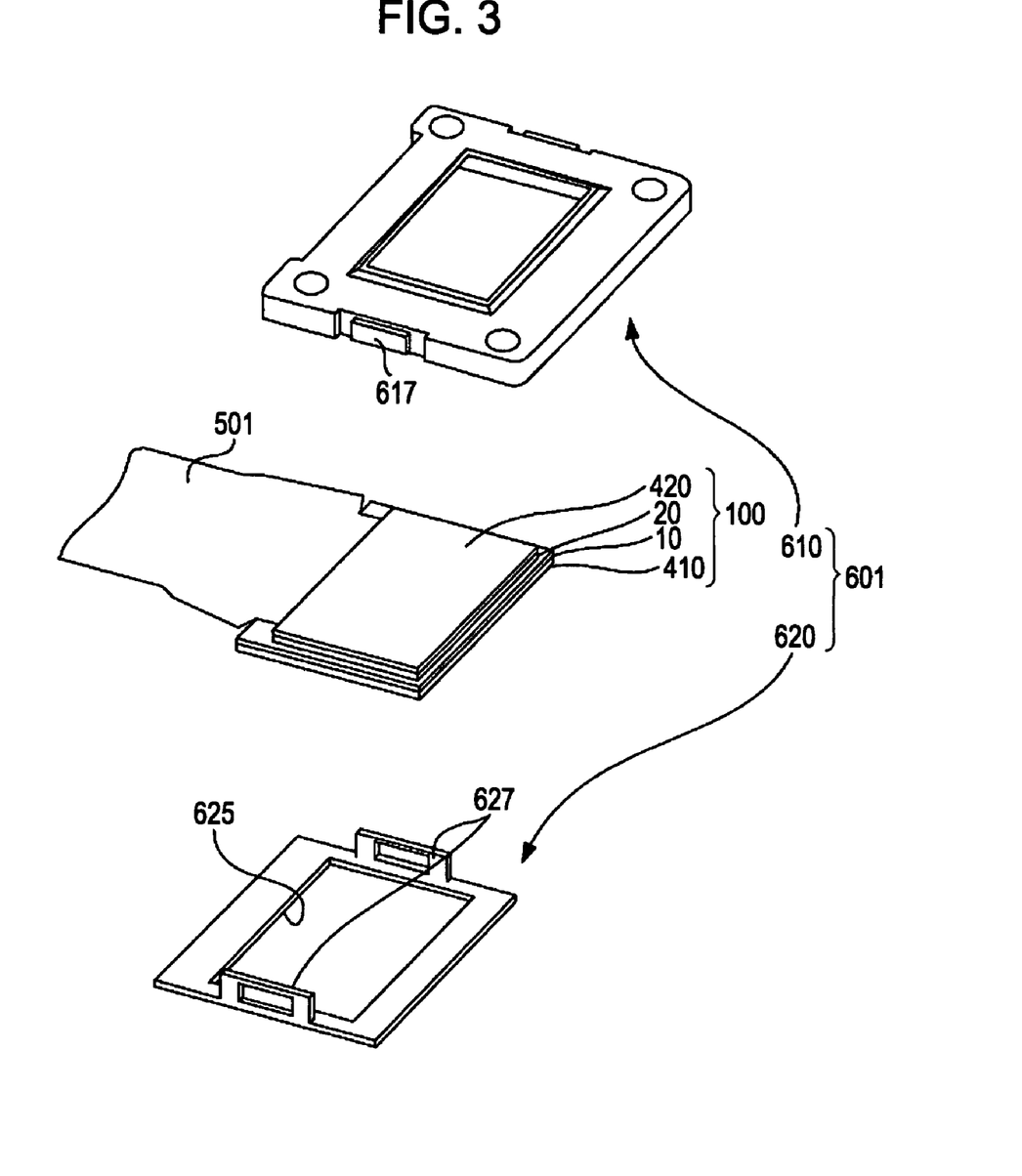
FIG. 3 is an exploded perspective view of a packaging case and the liquid crystal device.

The overall structure of the liquid crystal device according to the embodiment will be described with reference to FIGS. 1 to 3. FIG. 1 is a plan view of the overall structure of the liquid crystal device of the embodiment, denoted by reference numeral 100; FIG. 2 is a cross-sectional view taken along line II-II of FIG. 1; and FIG. 3 is an exploded perspective view of a packaging case and the liquid crystal device.

Referring to FIGS. 1 and 2, the liquid crystal device 100 of the embodiment includes a device substrate 10 and an opposing substrate 20 opposed to each other. The device substrate 10 is an example of "a first substrate" of the invention, and the opposing substrate 20 is an example of "a second substrate" of the invention. A liquid crystal layer 50 is disposed between the device substrate 10 and the opposing substrate 20. The device substrate 10 and the opposing substrate 20 are bonded together using a sealing material 52 at a sealing region 52a around an image display region 10a which is "a pixel region" according to the invention. The sealing material 52 is made of ultraviolet cure resin for bonding the substrates together. The sealing material 52 is applied onto the device substrate 10 and then hardened by ultraviolet irradiation in the process of manufacture. The sealing material 52 contains a dispersed gap material such as glass fibers or glass beads for leaving a fixed clearance (intersubstrate gap) between the device substrate 10 and the opposing substrate 20.

Furthermore, dustproof substrates 410 and 420 are disposed on the surfaces of the device substrate 10 and the opposing substrate 20 opposite to the liquid crystal layer 50, respectively. The dustproof substrates 410 and 420 are made of transparent glass, which are bonded to the device substrate 10 and the opposing substrate 20, respectively. A frame light shielding layer 425 (not shown in FIG. 1, see FIG. 2) as an example of "a second light shielding layer" of the invention is disposed on the surface of the dustproof substrate 420 facing the opposing substrate 20 in such a manner as to enclose the image display region 10a.

Referring to FIG. 1, a frame light shielding layer 53 that defines a frame region 53a of the image display region 10a is disposed on the surface of the opposing substrate 20 in parallel with the inside of the sealing region 52a containing the sealing material 52. The frame light shielding layer 53 is an example of "a first light shielding layer" of the invention. The frame region 53a is one example of "a first light shielding region" according to the invention. Of the peripheral region, the region outside the sealing region 52a containing the sealing material 52 has external-circuit connecting terminals 102 including image signal terminals to which image signals are supplied along a first side of the device substrate 10. A demultiplexer 7 is disposed inside the sealing region 52a along the first side in such a manner as to be coated with the frame light shielding layer 53. Scanning-line driving circuits 104 are disposed inside the sealing region 52a along the two sides next to the first side. Vertically conducting terminals 106 for connecting the substrates with vertical conductors 107 are disposed on the portions of the device substrate 10 facing the four corners of the opposing substrate 20. This allows electrical conduction between the device substrate 10 and the opposing substrate 20.

The device substrate 10 has thereon routing wires 90 for electrically connecting the external-circuit connecting terminals 102 to the demultiplexer 7, the scanning-line driving circuits 104, and the vertically conducting terminals 106.

Referring to FIG. 2, the device substrate 10 has thereon a layer structure in which pixel-switching TFTs serving as driving elements, scanning lines, data lines, and so on are disposed. The image display region 10a has a plurality of pixel electrodes 9a in matrix form on the wire layer including the pixel-switching TFTs, the scanning lines, and the data lines. On the pixel electrodes 9a is disposed an alignment layer. On the other hand, the opposing substrate 20 has a light shielding layer 23 on the surface facing the device substrate 10. The light shielding layer 23 is made of light-shielding metal film or the like and has a grid pattern or the like in the image display region 10a on the opposing substrate 20. In other words, the light shielding layer 23 functions as a black matrix which defines an opening of the image display region 10a, through which display light passes. An opposing electrode 21 made of a transparent material such as indium tin oxide (ITO) is disposed all over the light shielding layer 23 in such a manner as to be opposed to a plurality of pixel electrodes 9a. The opposing electrode 21 has thereon an alignment layer. The liquid crystal layer 50 is made of, for example, one kind or several kinds of nematic liquid crystal, which has a specified orientation between the pair of alignment layers.

The device substrate 10 also has thereon a light shielding layer 710, to be described later (see FIG. 5). The device substrate 10 may also have thereon an inspection circuit or an inspecting pattern for checking the quality or defects of the liquid crystal device 100 during manufacture or at shipment, in addition to the demultiplexer 7 and the scanning-line driving circuit 104.

Referring to FIG. 3, the liquid crystal device 100 with the above structure is housed in a packaging case 601 and is then mounted to an electronic device such as a liquid crystal projector. The external-circuit connecting circuits 102 of the liquid crystal device 100 connect to a flexible printed circuit board (hereinafter, abbreviated to an FPC) 501. The FPC 501 has an image-signal supply circuit thereon, to be described later. The liquid crystal device 100 has an optical member including an antireflection plate on the outer surface. Although a polarizer and a retarder may be mounted on the outer surface of the liquid crystal device 100, they may be mounted to the optical system of a liquid crystal projector to which the liquid crystal device 100 is mounted.

As shown in FIG. 3, the packaging case 601 is composed of a frame 610 for housing the liquid crystal device 100 and a cover 620 that covers the frame 610. The cover 620 is combined with the frame 610 in such a manner that hooks 627 on opposite rims are hooked on claws 617 on both sides of the frame 610.

The liquid crystal device 100 is housed in the frame 610 in such a manner that the opposing substrate 20 faces the frame 610 and the outer surface adjacent to the device substrate 10 is covered with the cover 620. Therefore, when the liquid crystal device 100 housed in the packaging case 601 is mounted to a liquid crystal projector or the like for use as a liquid-crystal light valve, light enters from the frame 610, passes through the liquid crystal device 100, and exits from the cover 620. The liquid crystal device 100 is fixed in the frame 610 with an adhesive in a state in which it is enclosed by the frame 610. Thus, the liquid crystal device 100 is enclosed by the frame 610. The peripheral region of the image display region 10a of the liquid crystal device 100 is covered with the frame 610 in such a state that it is housed in the packaging case 601. Thus, the frame 610 has a light-shielding function of preventing light leaks of the peripheral region or preventing stray light from entering from the peripheral region into the image display region 10a.

The cover 620 includes a frame main body having a window 625 as an opening and the hooks 627 on both sides of the main body. The window 625 is open in such a manner as to face the image display region 10a of the liquid crystal device 100 (see FIG. 1) to extract the light exiting from the image display region 10a.

Figure 4:
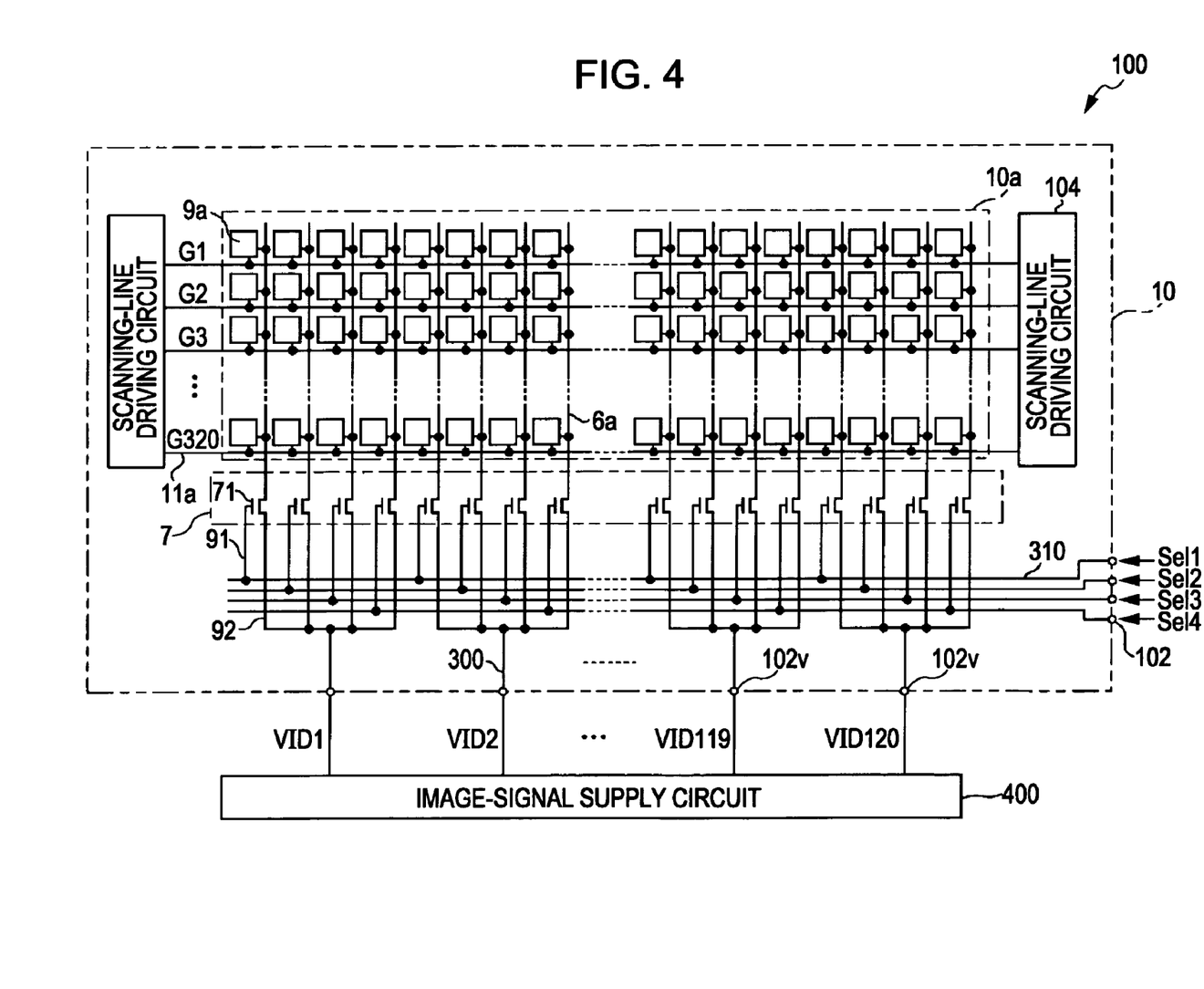
FIG. 4 is a circuit diagram showing the electrical structure of the liquid crystal device according to the embodiment.

Referring next to FIG. 4, the electrical structure of the liquid crystal device 100 according to the embodiment will be described. FIG. 4 is a circuit diagram showing the electrical structure of the liquid crystal device 100 according to the embodiment.

As shown in FIG. 4, the liquid crystal device 100 has the demultiplexer 7 and the scanning-line driving circuits 104 on the device substrate 10. Image-signal terminals 102v of the external-circuit connecting terminals 102 on the device substrate 10 connect to an external image-signal supply circuit 400.

The image display region 10a on the device substrate 10 has 320 scanning lines 11a extending laterally (or in the X direction) and 480 (=120×4) data lines 6a divided in groups of four lines extending longitudinally (or in the Y-direction) in such a manner as to have electrical insulation from the scanning lines 11a. The numbers of the scanning lines 11a and the data lines 6a are not limited to 320 and 480, respectively. While the number of the data lines in each group is four in this embodiment, it has only to be two or more.

The pixel electrodes 9a are arrayed in correspondence with the intersections between the 320 scanning lines 11a and the 480 data lines 6a. Accordingly, the pixel electrodes 9a of this embodiment are arrayed at a specified pitch in a 320 by 480 matrix form. Between the pixel electrodes 9a and the data lines 6a are disposed pixel switching TFTs whose respective conduction states are controlled in response to scanning signals supplied through the scanning lines 11a and a capacitor wire for storage capacitance to hold the voltage applied to the pixel electrodes 9a for a long time.

In this embodiment, four data lines 6a in one group are sometimes called line a, b, c, and d from the left to discriminate from each other. Specifically, line a denotes the $1^{st}$, $5^{th}$, $9^{th}$ to $477^{th}$ data lines 6a, line b denotes the $2^{nd}$, $6^{th}$, $10^{th}$ to $478^{th}$ data lines 6a, line c denotes the $3^{rd}$, $7^{th}$, $11^{th}$ to $479^{th}$ data lines 6a, and line d denotes the $4^{th}$, $8^{th}$, $12^{th}$ to $480^{th}$ data lines 6a.

Referring to FIG. 4, the scanning-line driving circuit 104 supplies scanning signals G1 to G 320 to the $1^{st}$ to $320^{th}$ scanning lines 11a, respectively.

The image-signal supply circuit 400 is disposed on the FPC 501 and is connected to the device substrate 10 via the image-signal terminals 102v. The image-signal supply circuit 400 outputs an image signal with a voltage according to the gray level of the pixel that contains a pixel electrode 9a corresponding to a scanning line 11a selected by the scanning-line driving circuit 104 and a data line 6a selected from the four data lines 6a of each group by the demultiplexer 7. The image signals supplied from the image-signal supply circuit 400 to the image-signal terminal 102v are supplied to the demultiplexer 7 through image signal lines 300.

In this embodiment, the number of the data lines 6a is 480, which is divided into groups of four lines, as described above. Therefore, the number of the image-signal terminals 102v is 120.

The demultiplexer 7 includes a plurality of TFTs 71 provided for each data line 6a. The TFTs 71 are of an n-channel type, whose drains are each connected to one end of each data line 6a. The sources of four TFTs 71 corresponding to the data lines 6a in one group are electrically connected to source lines 92 branching from the image signal line 300 and corresponding to the group, or in other words, connected in common to the image signal line 300 corresponding to the group.

Specifically, an $m^{th}$ group (m is an integer greater than or equal to 1 and less than or equal to 120) includes the $(4m-3)^{th}$ data line 6a of line a, the $(4m-2)^{th}$ data line 6a of line b, the $(4m-1)^{th}$ data line 6a of line c, the $(4m)^{th}$ data line 6a of line d. Therefore, the sources of the TFTs 71 corresponding to the four data lines 6a are connected in common to supply an image signal VID(m). The gate of the TFT 71 corresponding to the $(4m-3)^{th}$ data line 6a is supplied with a control signal Sel1 through the gate line 91 branching from a control signal line 310. Likewise, the gates of the TFTs 71 corresponding to the $(4m-2)^{th}$ data line 6a, the $(4m-1)^{th}$ data line 6a, and the $(4m)^{th}$ data line 6a are supplied with control signals Sel2, Sel3, and Sel4, respectively, through gate lines 91 branching from the control signal line 310. The control signals Sel1, Sel2, Sel3, and Sel4 are supplied from an external timing control circuit through the external-circuit connecting terminals 102.

Figure 5:
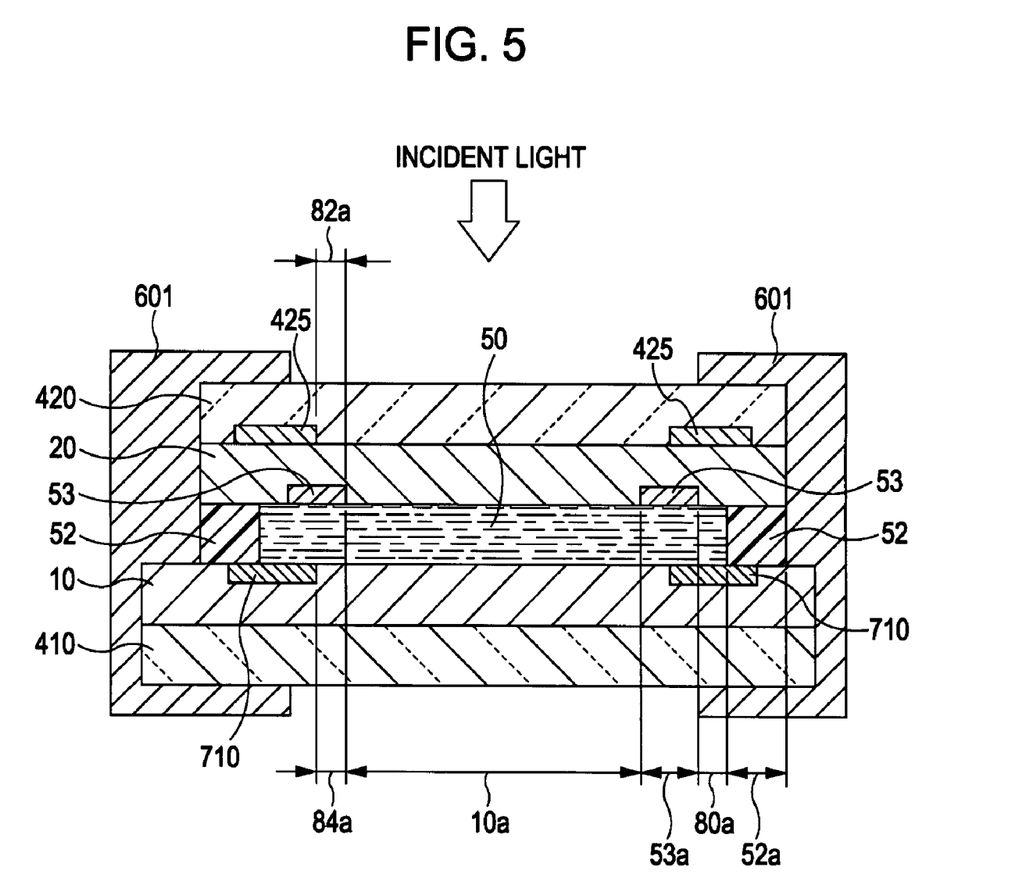
FIG. 5 is a cross-sectional view of the liquid crystal device housed in a packaging case, corresponding to FIG. 2.
Figure 6:
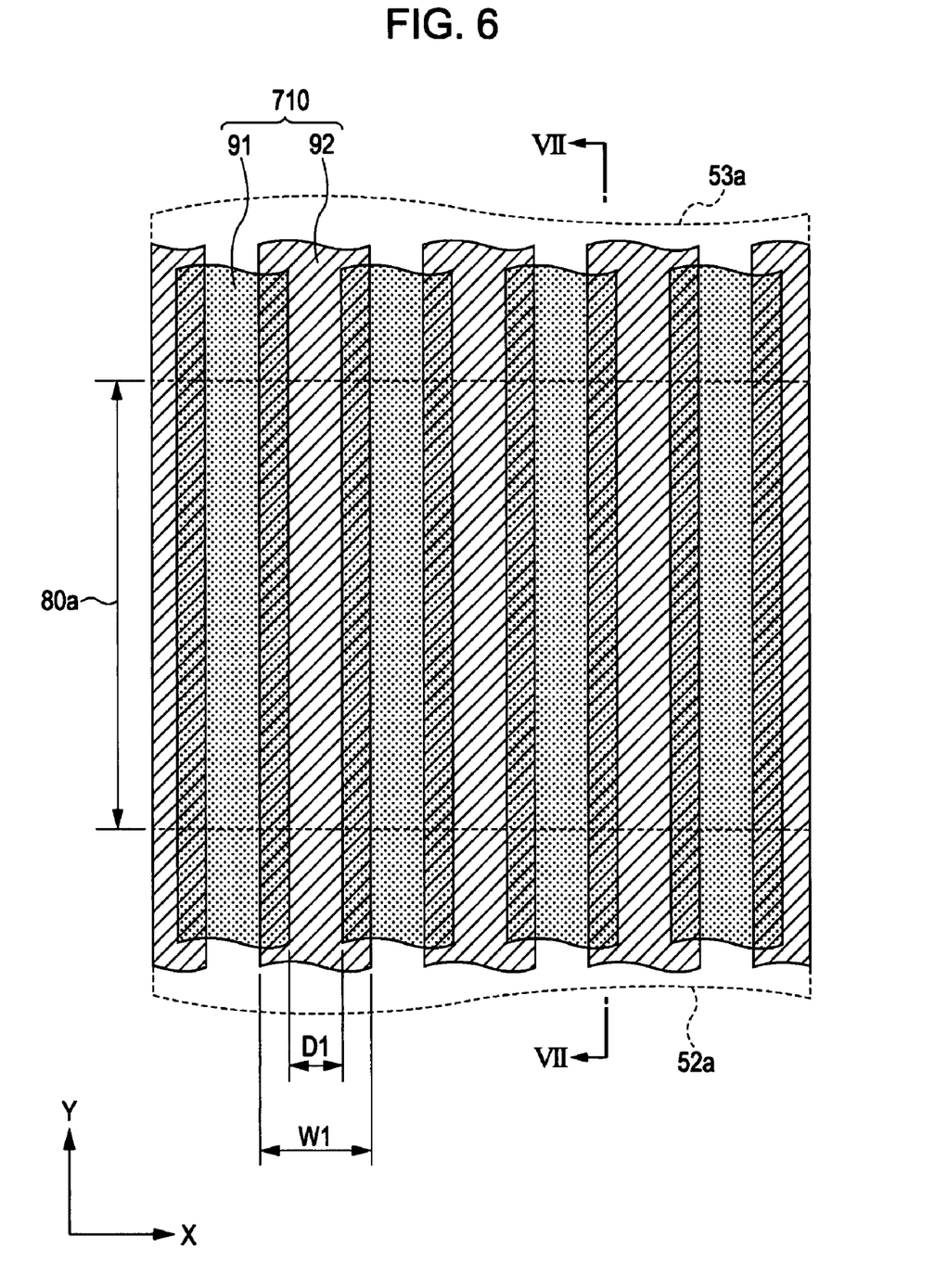
FIG. 6 is an enlarged plan view of region VI of FIG. 1.
Figure 7:
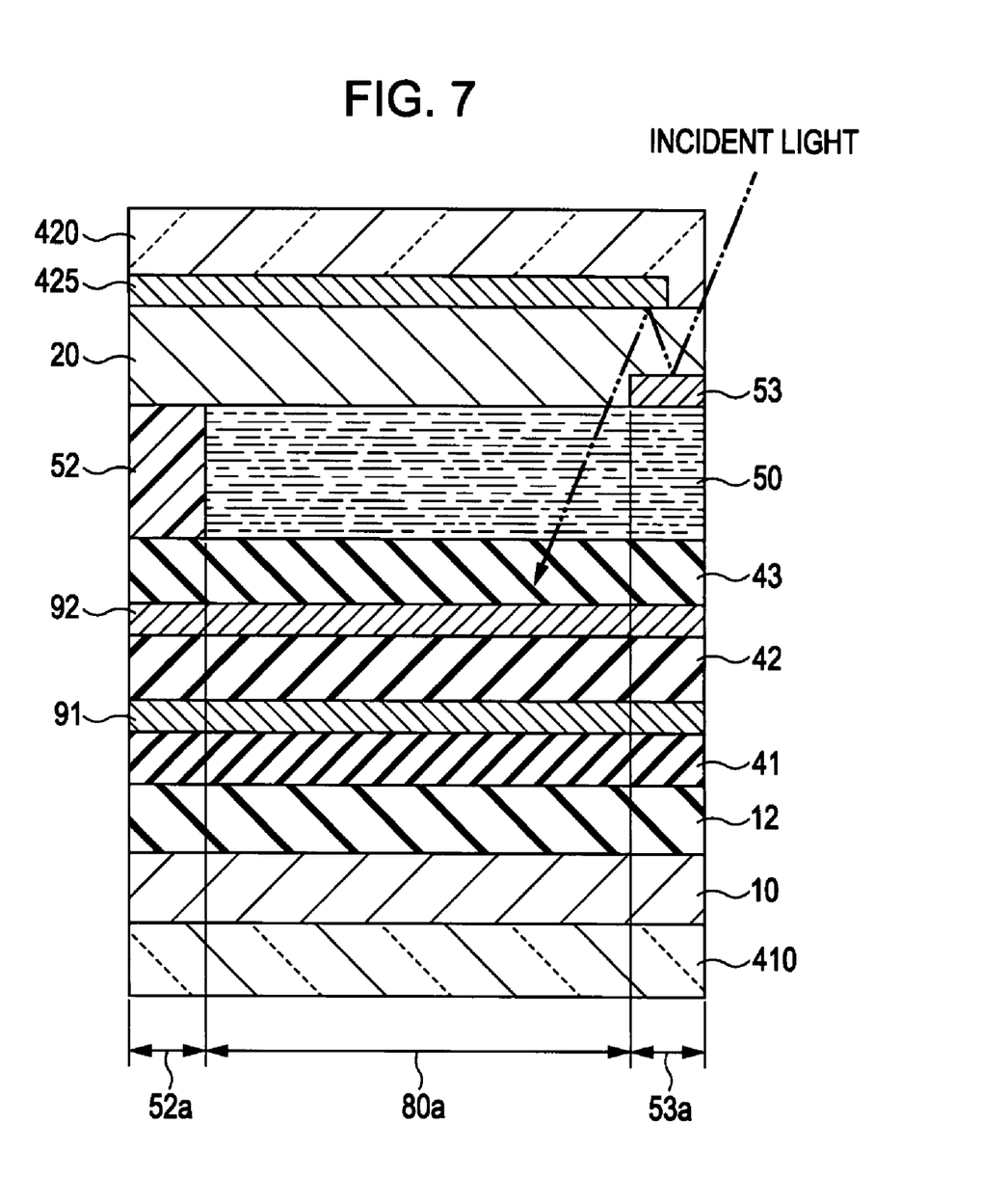
FIG. 7 is a cross-sectional view taken along line VII-VII of FIG. 6.

Referring now to FIGS. 5 to 7, the structure of light shield around the image display region 10a of the liquid crystal device 100 according to the embodiment will be described. FIG. 5 is a cross-sectional view of the liquid crystal device 100 housed in the packaging case 601, corresponding to FIG.

2. FIG. 5 principally shows light-shielding components around the image display region 10*a* of the liquid crystal device 100, and omits the other components as necessary. FIG. 5 shows the layers and members on different scales to facilitate recognition on the drawing.

Referring to FIG. 5, the frame region 53*a* on the opposing substrate 20 has the frame light shielding layer 53 (see FIG. 1). The frame light shielding layer 53 defines the periphery (that is, the frame or outline) of the image display region 10*a*. Therefore, the frame light shielding layer 53 is formed closer to the center of the image display region 10*a* than any of the packaging case 601, the frame light shielding layer 425, and the light shielding layer 710, to be described later. The frame light shielding layer 53 is disposed so as to define the periphery of the image display region 10*a* while leaving a design margin inside the sealing region 52*a* around the image display region 10*a* so as not to interfere with ultraviolet irradiation of the ultraviolet cure resin sealing material 52 (while leaving a clearance 80*a* between it and the sealing region 52*a* so as not to overlap with the sealing region 52*a*).

The frame light shielding layer 425 is disposed on the dustproof substrate 420 in such a manner as to enclose the image display region 10*a*. More specifically, the frame light shielding layer 425 is disposed on the dustproof substrate 420 so as to enclose the image display region 10*a* defined by the frame light shielding layer 53 while leaving a design margin outside the periphery of the image display region 10*a* (the region in which the sealing region 52*a* is located) (that is, keeping the specified clearance 82*a* between it and the image display region 10*a* so as not to overlap with the image display region 10*a*) and while having a portion overlapping with the frame region 53*a*, the clearance 80*a*, and the sealing region 52*a*. This reduces exit of incident light emitted from the light source adjacent to the opposing substrate 20 through the clearance between the frame light shielding layer 53 and the sealing material 52 (that is, the clearance 80*a* between the frame region 53*a* and the sealing region 52*a*).

However, if the frame light shielding layer 425 on the dustproof substrate 420 is formed off the design margin for overlapping with the frame light shielding layer 53 (that is, the clearance 80*a* between the frame region 53*a* and the sealing region 52*a* is not completely covered with the frame light shielding layer 425), incident light emitted from the light source adjacent to the opposing substrate 20 can exit from the liquid crystal device 100 through the clearance 80*a* between the frame region 53*a* and the sealing region 52*a*.

However, the embodiment shown in FIG. 5 is particularly constructed such that the light shielding layer 710 made of aluminum or the like is formed on the device substrate 10 in such a manner that at least part thereof overlaps with the frame light shielding layer 53 and the frame light shielding layer 425 in plan view. More specifically, the light shielding layer 710 is disposed on the device substrate 10 in such a manner as to have a portion overlapping with the frame light shielding layer 53 and also to partly overlap with the frame light shielding layer 425 while leaving a design margin outside the image display region 10*a* defined by the frame light shielding layer 53 (that is, while leaving a clearance 84*a* between it and the image display region 10*a* so as not to overlap with the image display region 10*a*). In other words, the light shielding layer 710 is disposed at least at part of the clearance 80*a* between the frame light shielding layer 53 and the sealing region 52*a* on the device substrate 10 in plan view. Accordingly, even if the frame light shielding layer 425 on the dustproof substrate 420 is formed off the design margin, exit of incident light from the liquid crystal device 100 through the clearance between the frame light shielding layer 53 and the sealing material 52 (that is, the occurrence of light leaks) can be reduced or prevented by the light shielding layer 710 on the device substrate 10. Thus, the light shielding effect around the image display region 10*a* of the liquid crystal device 100 can be increased.

Referring then to FIGS. 6 and 7, the light shielding layer 710 on the device substrate 10 will be described in more detail. FIG. 6 is an enlarged plan view of region VI of FIG. 1. FIG. 7 is a cross-sectional view taken along line VII-VII of FIG. 6. FIGS. 6 and 7 principally show light-shielding components around the image display region 10*a* of the liquid crystal device 100, and omits the other components as necessary. FIG. 7 shows the layers and members on different scales to facilitate recognition on the drawing.

Particularly in the embodiment shown in FIGS. 6 and 7, the light shielding layer 710 is expressed as the gate line 91 and the source line 92 described with reference to FIG. 4.

The gate line 91 is made of an aluminum light-shielding conductive film and is disposed on the multilayer structure in which an underlying insulating layer 12 and an interlayer insulator film 41 are stacked on the device substrate 10. The gate line 91 extends from the sealing region 52*a* to the frame region 53*a* (or from the frame region 53*a* to the sealing region 52*a*) in the Y-direction in the clearance 80*a* between the sealing region 52*a* and the frame region 53*a*.

The source line 92 is made of an aluminum light-shielding conductive film and disposed on the gate line 91 with an interlayer insulator film 42 in between. The source line 92 extends in the Y-direction in the clearance 80*a* between the sealing region 52*a* and the frame region 53*a*, like the gate line 91.

Specifically, the gate line 91 and the source line 92 made of an aluminum light-shielding conductive film which are disposed in different layers with the interlayer insulator film 42 in between are arranged in the Y-direction in the clearance 80*a* between the sealing region 52*a* and the frame region 53*a*. In other words, the gate line 91 and the source line 92 made of a light-shielding conductive film function as the light shielding layer 710 that shields light of the clearance 80*a* between the sealing region 52*a* and the frame region 53*a*. Therefore, there is no need to have the light shielding layer 710 separately from the gate line and the source line of the TFT 71. This allows size reduction of the liquid crystal device 100 while increasing the light shielding effect.

Referring again to FIGS. 6 and 7, the embodiment is particularly constructed such that the source line 92 is disposed between the adjacent gate lines 91, and that the source line 92 has a width W1 wider than the interval D1 between the adjacent gate lines 91 and overlaps with the adjacent gate lines 91. In other words, the source line 92 is disposed so as to cover the interval D1 between the adjacent gate lines 91. This further increases the light shielding effect of the liquid crystal device 100 and reduces the size. Moreover, this prevents the occurrence of a crack that may be generated when the light shielding layer 710 is in a single layer, thus improving the reliability of the liquid crystal device 100.

The light shielding layer 710 (that is, the gate lines 91 and the source lines 92 in the region VI) can reduce or prevent exit of incident light from the device substrate 10, the incident light being reflected by the frame light shielding layer 53 and then reflected again by the frame light shielding layer 425, as indicated by the chain double-dashed line of FIG. 7.

Furthermore, the embodiment is particularly constructed such that the light shielding layer 710 including the gate lines 91 and the source lines 92 contains aluminum having an optical density of 2 or more (that is, a light transmittance of 0.01 percent or less). This improves the light shielding effect of the light shielding layer 710. The presence of the light shielding layer 710 can reduce or prevent the light leaks through the clearance (the clearance 80a) between the frame light shielding layer 53 and the sealing material 52. In other words, it is possible to improve the light shielding effect on the periphery of the image display region 10a of the liquid crystal device 100.

Figure 8:
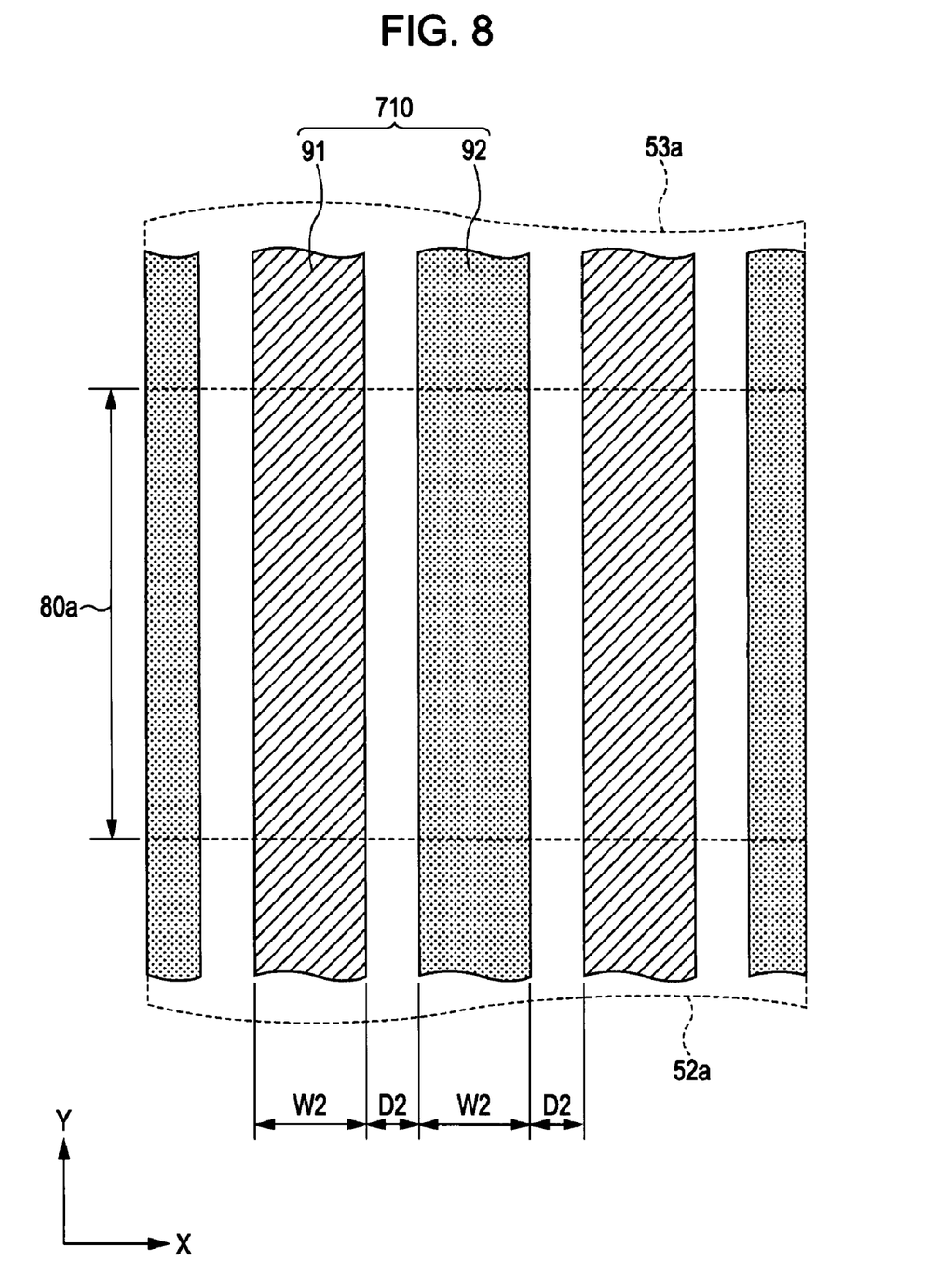
FIG. 8 is an enlarged plan view of a modification to the same effect as that of FIG. 6.

Referring next to FIG. 8, a modification of the liquid crystal device 100 of the embodiment will be described. FIG. 8 is an enlarged plan view of the modification to the same effect as that of FIG. 6.

As shown in FIG. 8, the gate line 91 and the source line 92 that are used also as the light shielding layer 710 may have a width W2 of about 10 µm and may be arranged at an interval D2 of about 2 µm. This also improves the light shielding effect of the liquid crystal device 100 by using the gate lines 91 and the source lines 92 partially disposed between the sealing region 52a and the frame region 53a. Furthermore, when the interval D2 between the gate line 91 and the source line 92 is set as narrow as 2 µm, the light shielding effect can be increased still further. In this case, the gate lines 91 and the source lines 92 may either be made of light-shielding conductive films disposed at different layers with an interlayer insulator film in between or be made of light-shielding conductive films at the same layer.

If the interval D2 between the gate line 91 and the source line 92 is larger than 2 µm, the light-shielding function of the gate lines 91 and the source lines 92 (that is, the light shielding layer 710) can be decreased. However, the presence of the gate lines 91 and the source lines 92 serving as the light shielding layer 710 can increase the light shielding effect correspondingly in comparison with the case without the light shielding layer 710.

Electronic Device

Figure 9:
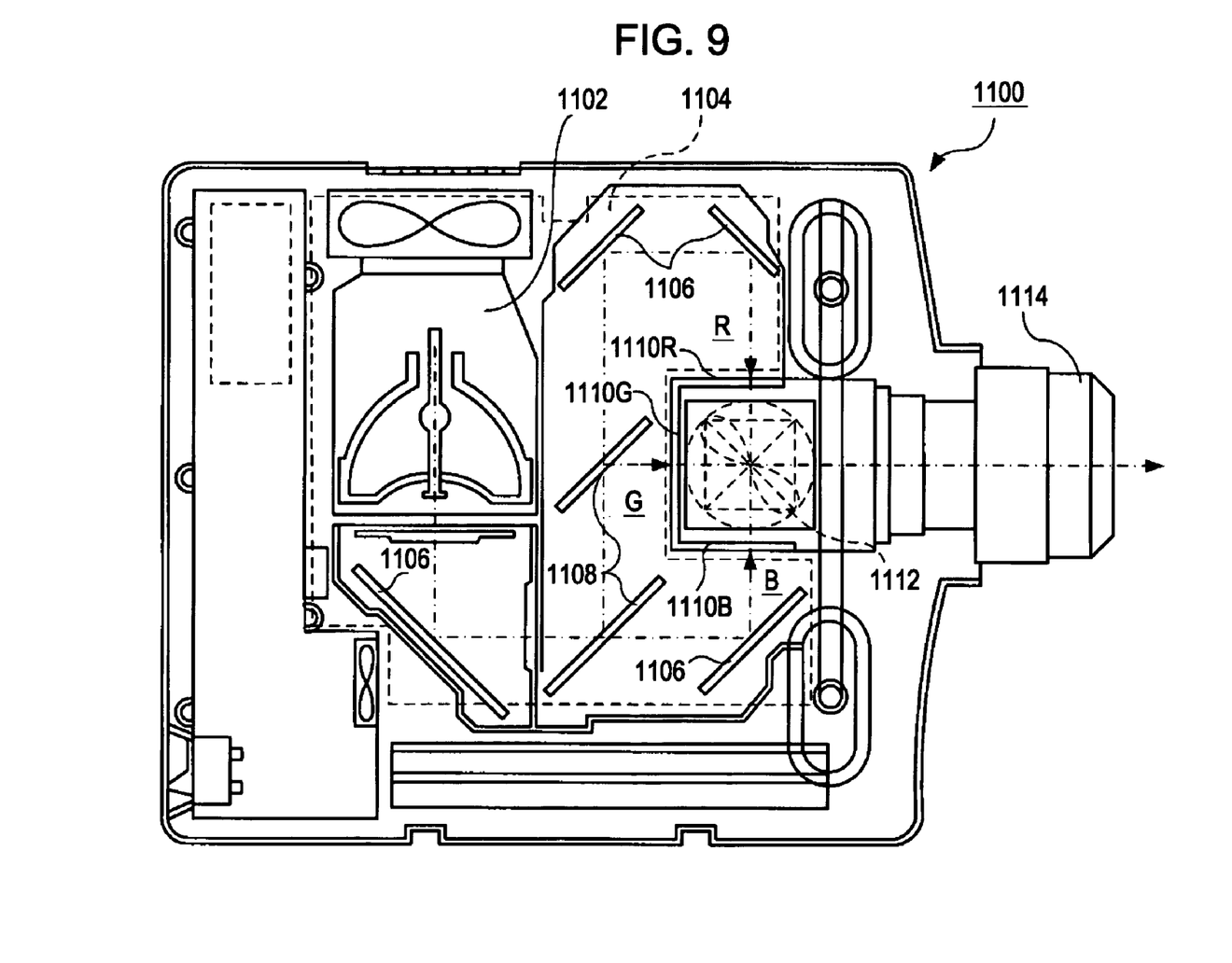
FIG. 9 is a plan view showing the structure of a projector as an example of an electronic device incorporating the electrooptic device.

Referring now to FIG. 9, a projector that uses the above-described liquid crystal device 100 as a light valve will be described. FIG. 9 is a plan view showing the structure of the projector, denoted by numeral 1100.

As shown in FIG. 9, the projector 1100 has therein a lamp unit 1102 including a white light source such as a halogen lamp. The light emitted from the lamp unit 1102 is separated into the three primary colors of RGB by four mirrors 1106 and two dichroic mirrors 1108 disposed in a light guide 1104, and enters light valves 1110R, 1110G, and 1110B corresponding to the respective primary colors.

The light valves 1110R, 1110G, and 1110B are constructed as liquid crystal devices each housed in the above-described packaging case, and are driven by R, G, and B color signals supplied from an image-signal supply circuit, respectively. The light modulated by the light valves 1110R, 1110G, and 1110B enters a dichroic prism 1112 from three directions. The dichroic prism 1112 refracts R and B lights at 90 degree and allows G light to go straight. The images of the three colors are combined and therefor a color image is projected onto a screen or the like through a projection lens 1114.

Since corresponding RGB lights enter the light valves 1110R, 1110G, and 1110B through the dichroic mirrors 1108, there is no need to provide the light valves 1110R, 1110G, and 1110B with a color filter.

In addition to the electronic device described with reference to FIG. 9, there are various electronic devices such as portable computers, portable phones, liquid-crystal televisions, viewfinder or monitor-direct-view type videotape recorders, car navigation systems, pagers, electronic notebooks, calculators, word processors, workstations, TV phones, POS terminals, and devices having a touch panel. It is needless to say that the invention can be applied to these electronic devices.

The invention can also be applied to a reflective liquid crystal device that has liquid crystal on silicon (LCOS), a plasma display (PDP), a field-emission display (FED), a surface-conduction display (SED), an organic EL display, a digital micromirror device (DMD), and an electrophoresis device.

It is to be understood that the invention is not limited to the above-described embodiments and that various changes and modifications may be made without departing from the sprit and scope as set out in the accompanying claims and the specification; electrooptic devices with such modifications and electronic devices having the electrooptic devices are also within the technical scope of the invention.

The entire disclosure of Japan Patent Application No. 2006-157016, filed Jun. 6, 2006 is expressly incorporated by reference herein.

What is claimed is:

1. An electrooptic device comprising:
a pair of first and second substrates that sandwich an electrooptic material;
a plurality of scanning lines and data lines arranged in a matrix pattern;
a plurality of pixel electrodes disposed in a pixel region on the first substrate, each of the pixel electrodes arranged in correspondence with intersections between the scanning lines and the data lines;
a demultiplexer configured to select the data lines for receiving an image signal, the demultiplexer having gate lines and source lines;
a first light shielding layer disposed on the second substrate, the first light shielding layer defining a periphery of the pixel region;
a sealing material that bonds the first substrate and the second substrate together in a sealing region around a periphery of a first light shielding region where the first light shielding layer is disposed;
a dustproof substrate disposed on a surface of the second substrate opposite to the electrooptic material;
a second light shielding layer disposed between the dustproof substrate and the second substrate so as to surround the pixel region; and
a third light shielding layer having the gate lines and the source lines of the demultiplexer, the gate lines and the source lines extending in a same direction and an edge of each of the gate lines and an edge of each of the source lines overlapping each other, the third light shielding layer disposed on the first substrate so as to at least partly overlap with the first and second light shielding layers.

2. The electrooptic device according to claim 1, wherein the third light shielding layer is formed at least with a line made of a light-shielding conductive film.

3. The electrooptic device according to claim 2, wherein the third light shielding layer includes a plurality of first lines, adjacent first lines being separated by a gap and a plurality of second lines arranged in a layer different from the plurality of first lines with an interlayer insulator film interposed therebetween, the second lines disposed to overlap with the gaps between the adjacent first lines.

4. The electrooptic device according to claim 2, wherein the third light shielding layer includes a plurality of lines arranged at an interval of 2 µm or less.

5. The electrooptic device according to claim 1, wherein the third light shielding layer includes a conductive film having an optical density of 2 or more.

6. An electronic device comprising the electrooptic device according to claim 1.

7. The electrooptic device according to claim 1, wherein the gate lines overlap the source lines between the sealing material and the first light shielding layer.

8. An electrooptic device comprising:

a substrate;

a plurality of scanning lines and data lines arranged in a matrix pattern;

a plurality of pixel electrodes arranged in correspondence with intersections between the scanning lines and the data lines; and a demultiplexer configured to select the data lines for receiving an image signal, the demultiplexer having a plurality of gate lines and source lines, wherein the gate lines are arranged at specified intervals in a periphery of a pixel region in which the plurality of pixel electrodes are disposed, the gate lines being made of a first light-shielding conductive film, and adjacent gate lines being separated by a gap; and the source lines are made of a second light-shielding conductive film arranged in a layer different from the plurality of gate lines with an interlayer insulator film interposed therebetween, the source lines disposed to overlap with the gaps between the adjacent gate lines, wherein the gate lines and the source lines extend in a same direction and an edge of each of the gate lines and an edge of each of the source lines overlap each other.

9. An electrooptic device comprising:

a pair of first and second substrates that sandwich an electrooptic material;

a plurality of pixel electrodes disposed in a pixel region on the first substrate;

a first light shielding layer disposed on the second substrate, the first light shielding layer defining a periphery of the pixel region;

a sealing material that bonds the first substrate and the second substrate together in a sealing region around a periphery of a first light shielding region where the first light shielding layer is disposed;

a dustproof substrate disposed on a surface of the second substrate opposite to the electrooptic material;

a second light shielding layer disposed between the dustproof substrate and the second substrate so as to surround the pixel region; and a third light shielding layer disposed on the first substrate so as to at least partly overlap with the first and second light shielding layers, the third light shielding layer including a plurality of lines arranged at an interval of 2 μm or less, the lines made of a light-shielding conductive film.

* * * * *